(12) United States Patent
Donnenhoffer

(10) Patent No.: US 7,111,724 B2
(45) Date of Patent: Sep. 26, 2006

(54) FLUID OPERATED SELF ALIGNING ROLLER

(75) Inventor: James J. Donnenhoffer, Terre Haute, IN (US)

(73) Assignee: Ultra Design and Engineering, LLC, Noblesville, IN (US)

(*) Notice: Subject to any disclaimer, the term of this patent is extended or adjusted under 35 U.S.C. 154(b) by 0 days.

(21) Appl. No.: 11/186,180

(22) Filed: Jul. 21, 2005

(65) Prior Publication Data
US 2006/0027444 A1    Feb. 9, 2006

Related U.S. Application Data

(63) Continuation-in-part of application No. 10/910,116, filed on Aug. 3, 2004, now Pat. No. 6,981,583.

(51) Int. Cl.
*B65G 39/16*    (2006.01)

(52) U.S. Cl. .................. 198/807; 198/810.03

(58) Field of Classification Search .......... 198/807, 198/810.03, 806, 811
See application file for complete search history.

(56) References Cited

U.S. PATENT DOCUMENTS

| | | | |
|---|---|---|---|
| 3,751,122 A | 8/1973 | Dubay | |
| 4,976,342 A * | 12/1990 | Hwang | 198/495 |
| 5,117,969 A * | 6/1992 | Roth | 198/807 |
| 5,808,645 A * | 9/1998 | Reeves et al. | 347/103 |
| 5,833,106 A | 11/1998 | Harris | |
| 5,833,171 A | 11/1998 | Harris | |
| 5,899,321 A | 5/1999 | El-Ibiary | |
| 6,668,526 B1 | 12/2003 | Schmidt | |
| 6,981,583 B1 * | 1/2006 | Donnenhoffer | 198/807 |
| 2003/0220036 A1 * | 11/2003 | Lee et al. | 442/153 |

FOREIGN PATENT DOCUMENTS

EP    0 522 262 A1    1/1993

\* cited by examiner

Primary Examiner—James R. Bidwell
(74) Attorney, Agent, or Firm—Woodard, Emhardt, Moriarty, McNett & Henry LLP

(57) ABSTRACT

A pressurized bladder system is associated with a first roller. In one embodiment, the conveyor belt extends around the roller which is automatically centered by the bladder. In alternate embodiments, the first roller is positioned adjacent an impression roller with the bladder operable to control the positioning of the first roller relative to the impression roller.

6 Claims, 13 Drawing Sheets

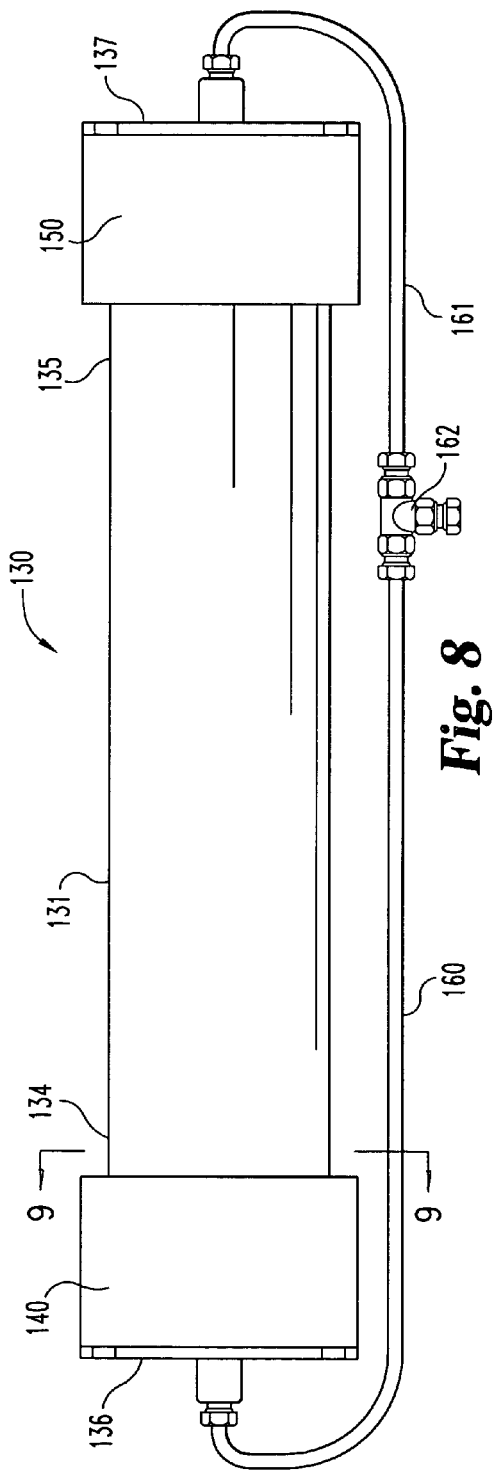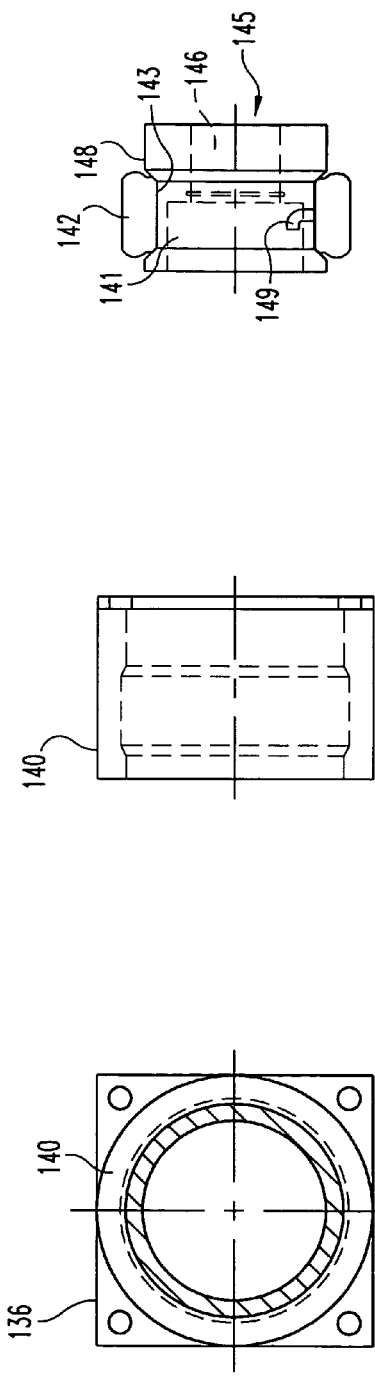

FLUID OPERATED SELF ALIGNING ROLLER

This application is a continuation-in-part of U.S. patent application Ser. No. 10/910,116, filed Aug. 3, 2004 now U.S. Pat. No. 6,981,583.

BACKGROUND OF THE INVENTION

The present invention relates generally to the field of conveyor belts.

DESCRIPTION OF THE PRIOR ART

Many conveyors incorporate a continuous looped belt extending around and supported by a plurality of rollers. Through continued use, the belt may become misaligned or off center relative to the rollers resulting in damage to the edged portion of the belt and even stoppage of the conveyor. Further, articles conveyed by the belt are subjected to movement along a line other than the longitudinal axis of the conveyor. Thus, it is the practice to periodically stop the conveyor in order to realign the belt relative to the central axis of the conveyor resulting in down time and added cost.

In order to solve the aforementioned problem, a variety of self correcting or self centering devices have been incorporated into conveyers in an attempt to automatically align the belt. One such device is shown in the U.S. Pat. No. 6,668,526 issued to Josef Schmidt. The Schmidt device includes a tracking roller pivotally mounted to a frame to adjust the flow path of the web of material in a packaging machine. Another approach is disclosed in U.S. Pat. No. 5,833,171 issued to J. C. Harris. In the Harris device, a rotating sleeve is coaxially mounted upon an inner non-rotating but pivoting sleeve. As the web runs over the rotating sleeve, any imbalance in lateral web tension will cause the non-rotating pivoting sleeve to pivot at its center with respect to the longitudinal axis of the shaft permitting the non-rotating pivoting sleeve and coaxial rotating sleeve to pivot on the side of least tension until the web tension is equalized across the coaxial sleeve. J. C. Harris also discloses in his U.S. Pat. No. 5,833,106 a similar web tension equalizing roll and tracking apparatus wherein the equalizing roll has a common axis with a shaft mounted horizontally on two bearings for rotation.

The concept of utilizing a pressurized bladder or bladders for centering a conveyor roller may also be utilized in the construction of rollers for applying or metering various liquids onto an impression or applicator roller. For example, a ductor roller is movable to and from an impression roller to evenly apply liquid, such as ink, onto the impression roll. Likewise, a metering roller may be located adjacent an impression roller to control the amount or meter the liquid applied to the impression roller. In both cases, the doctor roller or metering roller may be cocked through usage and/or improper set-up relative to the impression roller and it is therefore desirable to incorporate an automatic device to evenly space the ductor roller/metering roller relative to the impression roller. I have therefore disclosed herein various pressurized bladders to evenly space the ductor roller/metering roller relative to the impression roller.

SUMMARY OF THE INVENTION

One embodiment of the present invention is a fluid operated device for automatically aligning a roller. A roller with opposite ends has a first axis of rotation with the opposite ends rotatably mounted to a roller frame. A support frame has the roller frame movably mounted thereto to allow the roller frame to move relative to the support frame and the first axis of rotation to become skewed to a second axis of rotation. A first pressurizable bladder is positioned between the roller frame and the support frame and normally urges the roller to move from the second axis of rotation to the first axis of rotation.

Another embodiment includes a liquid applicator with a first rotatably mounted roller having a first cylindrical surface and a second rotatably mounted roller having a second cylindrical surface positioned adjacent the first cylindrical surface forming a liquid receiving area. An axle has a longitudinal axis that extends through the second roller but moves relative to the first roller to allow axis to become skewed moving from a first position to a second position. A pressurizable bladder extends between the second roller and the axle and has a constant internal pressure to urge the second roller against the first roller at a constant pressure even though the axle moves between the first position and the second position.

It is an object of the present invention to provide a device for automatically spacing a first roller apart an equal distance along its length from a second roller.

A further object of the present invention is to provide a ductor roller or metering roller that is automatically positioned relative to an impression roller by means of a pressurized bladder or bladders.

Related object and advantages of the present invention will be apparent from the following description.

BRIEF DESCRIPTION OF THE DRAWINGS

FIG. 8 is the same view as FIG. 2 only showing the fifth alternate embodiment of the centering roller.

FIG. 9 is a cross-sectional view taken along the line 9—9 of FIG. 8 and viewed in the direction of the arrows.

FIG. 10 is a side view of the outer mount.

FIG. 11 is a side view of the inner hub, bladder and bearings.

DESCRIPTION OF THE PREFERRED EMBODIMENTS

Figure 1:
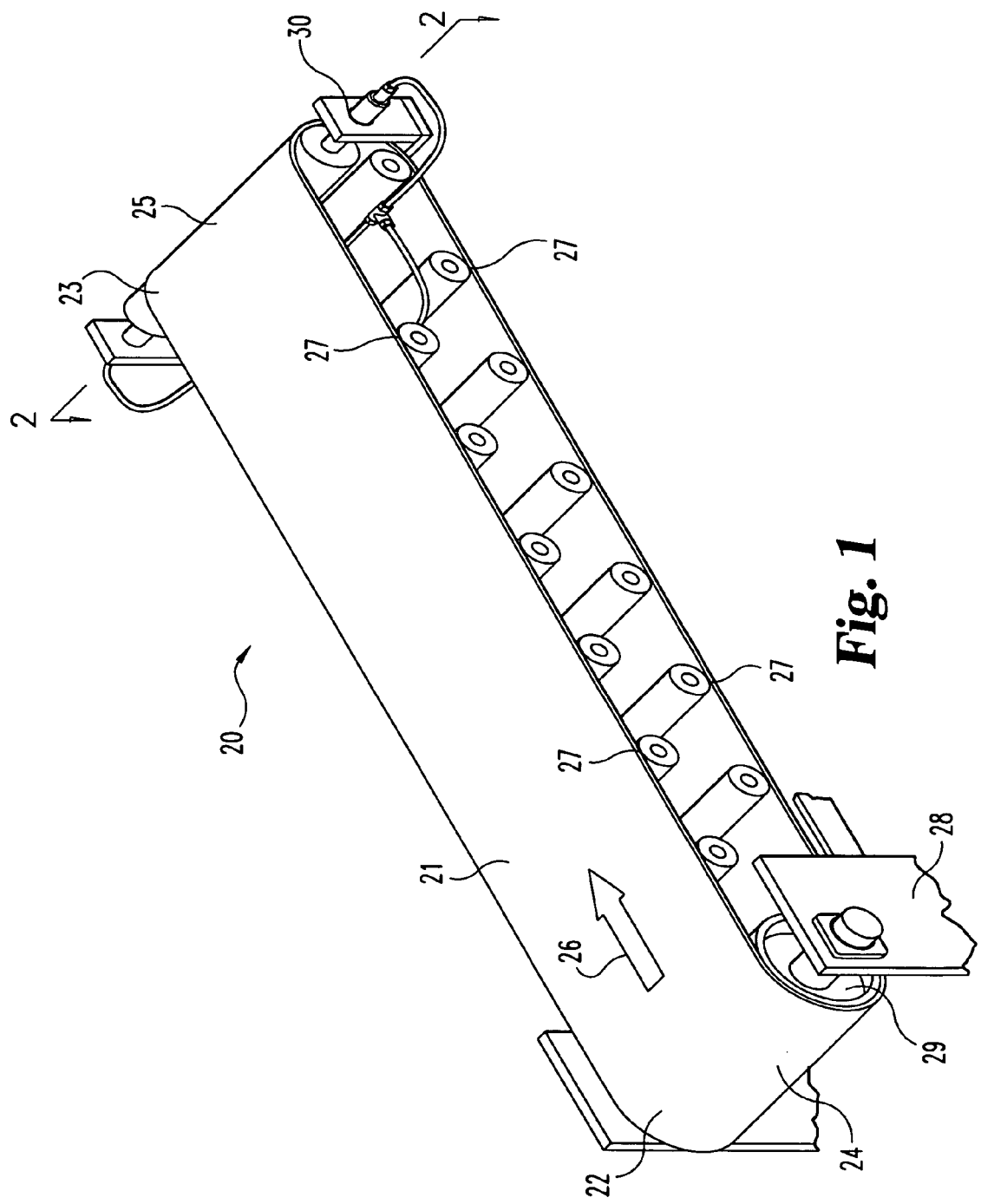
FIG. 1 is a perspective view of a conveyor incorporating the fourth alternate embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown the fourth alternate embodiment of the present invention including a conveyor 20 having an endless conveyor belt 21 with a first loop end 22 and opposite second loop end 23 forming respectively the entrance 24 and exit 25 of the conveyor. Articles resting atop belt 21 are conveyed from the conveyor entrance 24 to the conveyor exit 25 in the direction of arrow 26. A plurality of conventional rollers 27 are rotatably mounted to the conveyor frame 28. Rollers 27 extend across in perpendicular fashion to the direction of travel 26 with belt 21 extending around the rollers.

Roller 29 located at loop end 22 may be connected to a conventional drive mechanism to cause the conveyor to rotate in a clockwise direction as viewed in FIG. 1. At the opposite end 23 of the conveyor is located a belt centering device 30 for automatically centering belt 21 with respect to the conveyor and rollers 27.

Belt centering device 30 (FIG. 2) includes a belt-centering roller 31 having an axis of rotation 32 extending longitudinally through the center of the roller. Axis 32 extends perpendicular across the direction of travel 26 (FIG. 1).

Roller 31 has an outer circumferentially extending cylindrical surface 33 (FIG. 3) with belt 21 being in contact with surface 33 as the belt extends across the top 39, side 40, and bottom 41 of the roller. Belt 21 extends around roller 31 through an angle of approximately 180 degrees as the belt extends from top 39 to bottom 41 of the roller. The belt is in continuous contact with the roller between the top portion 39 of the roller and bottom portion 41 with the belt being in contact with approximately one-half of the circumferential surface 33 as the belt extends around the roller.

Roller 31 is hollow having a pair of opposite end portions 34 and 35 rotatably mounted respectively to axles 42 and 43. Axles 42 and 43 are respectively fixedly secured to upstanding brackets 36 and 37 (FIG. 2) mounted atop plate 38, in turn, fixedly secured to frame 28.

Each end portion 34 and 35 is recessed and receives a conventional bearing rotatably receiving a bladder housing. An inflatable fluid pressurized bladder is located within the bladder housing and, in turn, is sealingly mounted to the axle. End portion 35 (FIG. 4) will now be described it being understood that an identical description applies to end portion 34.

End portion 35 includes a recess 45 in which are located a pair of spaced apart bearings 46 and 47 each extending around the longitudinal axis 32 of the roller. Bladder housing 48 includes a pair of side portions 49 and 50 aligned with bearings 46 and 47 and extends around axis 32. A conventional snap ring 65 is removably mounted to continuous recess 66 in end portion 45. Recess 66 extends continuously around axis 32 allowing the C-shaped snap ring 65 to be inserted therein immediately adjacent bearing 47 thereby holding the bearings, bladder housing and bladder in place. Ridge 51 of housing 48 projects between bearings 46 and 47 spacing the bearings apart. A continuous recess 52 opens inwardly towards axis 32 and is positioned between side portions 49 and 50 to receive a fluid pressurizable bladder 53.

Bladder 53 is donut shaped having a central hole 54 through which axle 43 extends. Bladder 53 flares outwardly surrounding hole 54 and is sealingly clamped to axle 43 by a pair of wire clamps 55 and 56. Bladder 53 extends completely around axis 32 and projects into recess 52.

Axle 43 includes a fluid passage 57 extending from the end 58 of the axle to location 59 whereat the passage opens into bladder 53 allowing control of the fluid pressure within the bladder.

End portion 34 includes a bladder 63 identical to bladder 53 with bladder 63 being mounted to axle 42 by wire clamps and contained within a bladder housing, in turn, bearingly received by bearings provided in end portion 34 in a manner identical to that previously described for end portion 35. Axle 42 includes a passage 64 identical to passage 57 to allow control of the fluid pressure within bladder 63.

A pair of fluid lines 60 and 61 (FIG. 2) are connected respectively to passages 64 and 57 with the opposite ends of lines 60 and 61 connected to a conventional fluid pressure valve 62, in turn, connectable to a source of fluid pressure. Lines 60 and 61 are in fluid communication with each other thereby equalizing the fluid pressure within each line and also equalizing the fluid pressure within bladders 63 and 53.

In operation, roller 31 is freely rotatably upon axles 42 and 43 which are stationary. Likewise, bladders 53 and 63 along with the respective bladder housings do not rotate.

Figure 4:
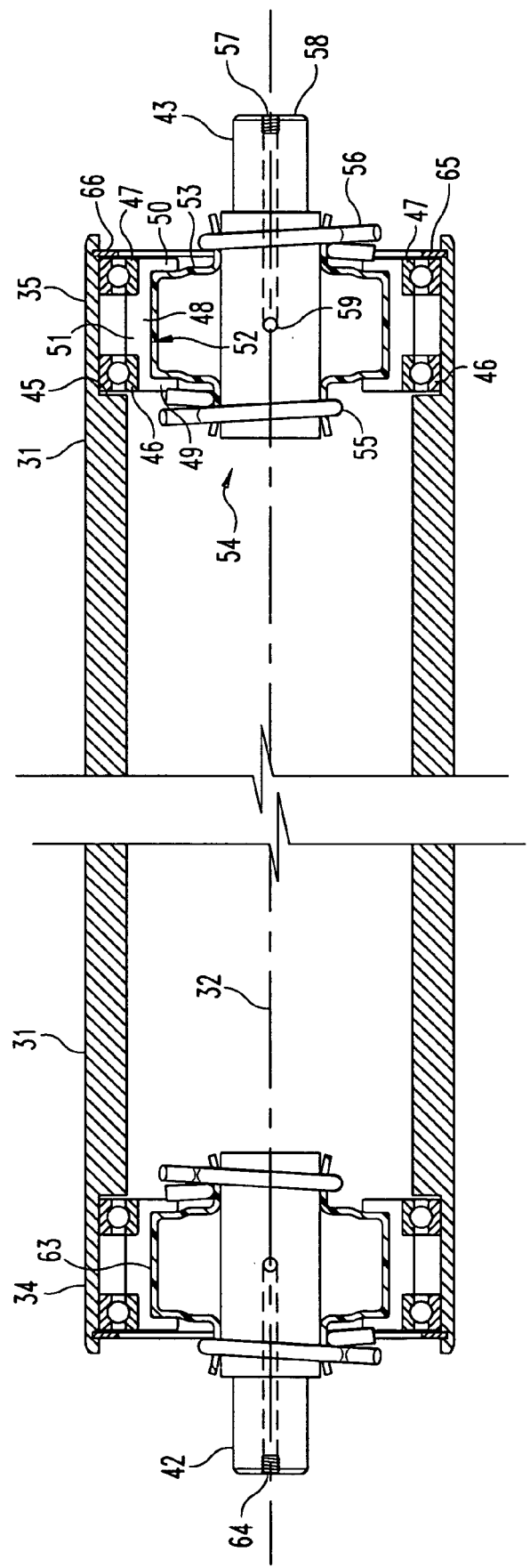
FIG. 4 is an enlarged fragmentary cross-sectional view taken along the line 4—4 of FIG. 2 and viewed in the direction of the arrows.
Figure 5:
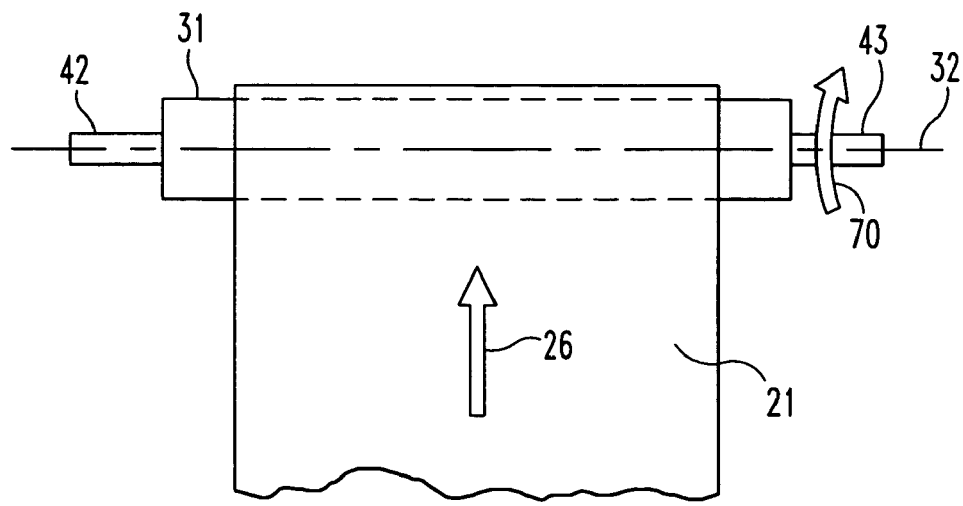
FIG. 5 is an enlarged fragmentary top view of the exit end of the conveyor illustrating the conveyor belt centered on the conveyor.

FIG. 5 illustrates conveyor belt 21 extending around roller 31. With conveyor belt 21 moving in the direction of arrow 26, roller 31 is caused to rotate in the direction of arrow 70 about axis of rotation 32 with belt 21 being located equidistant between the opposite ends of the roller at the same time the bladders are not distorted and remain as shown in FIG. 4.

Figures 2, 3:
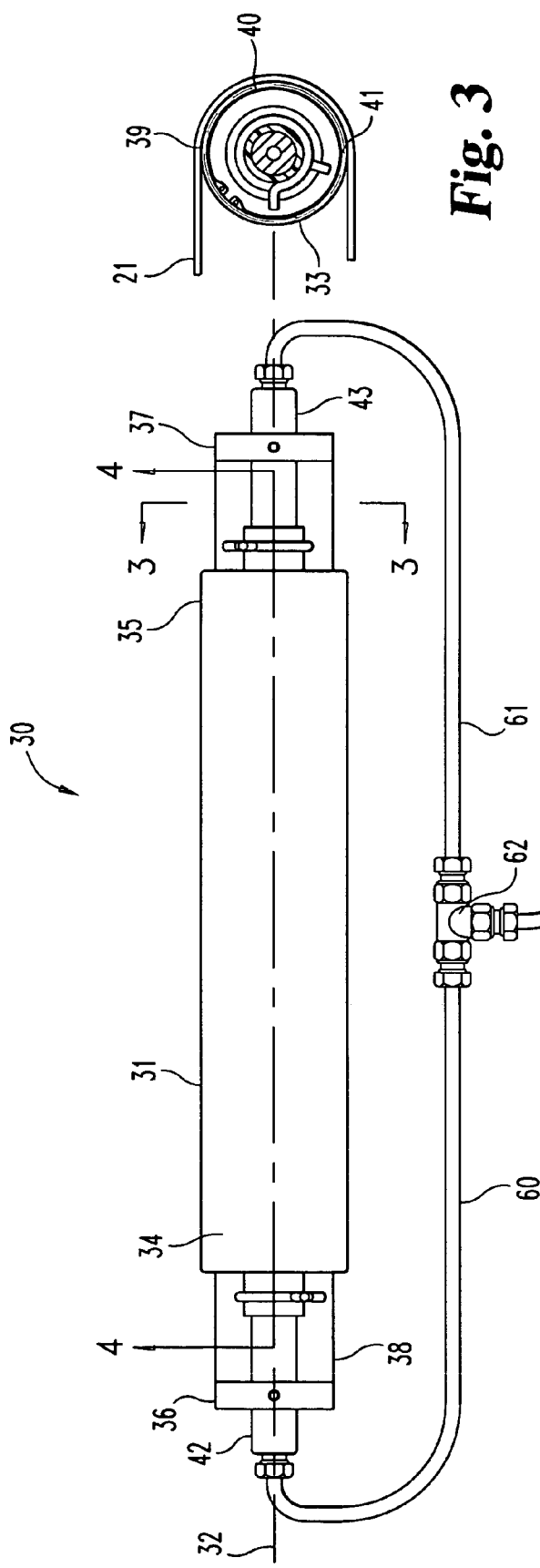
FIG. 2 is an enlarged cross-sectional view taken along the line 2—2 of FIG. 1 and viewed in the direction of the arrows.
FIG. 3 is an end cross-sectional view taken along the line 3—3 of FIG. 2 and viewed in the direction of the arrows.
Figure 6:
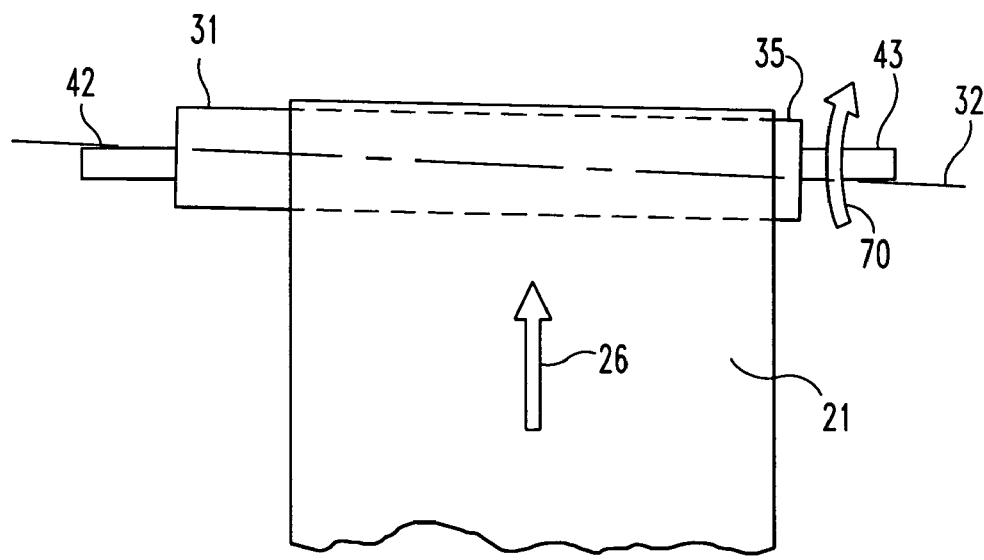
FIG. 6 is the same view as FIG. 5 only illustrating the conveyor belt located off center relative to the conveyor.

In the event belt 21 becomes off center with respect to roller 31 as illustrated in FIG. 6, the belt will move closer to one end of the roller than the opposite end. For example, belt 21 is shown in FIG. 6 as being closer to end 35 as compared to end 34 of roller 31. As the belt shifts to the right as viewed in FIG. 6, the belt exerts force on roller 31 to cause end 35 to move toward the opposite end or entrance end of the conveyor with end portion 34 of roller 31 moving in the opposite direction. At the same time, axles 42 and 43 are held stationary in brackets 36 and 37 (FIG. 2). Thus, bladders 53 and 63 are squeezed from their normal position depicted in FIG. 4 to a cocked position depicted in FIG. 7 as the roller cocks relative to axles 42 and 43.

Figure 7:
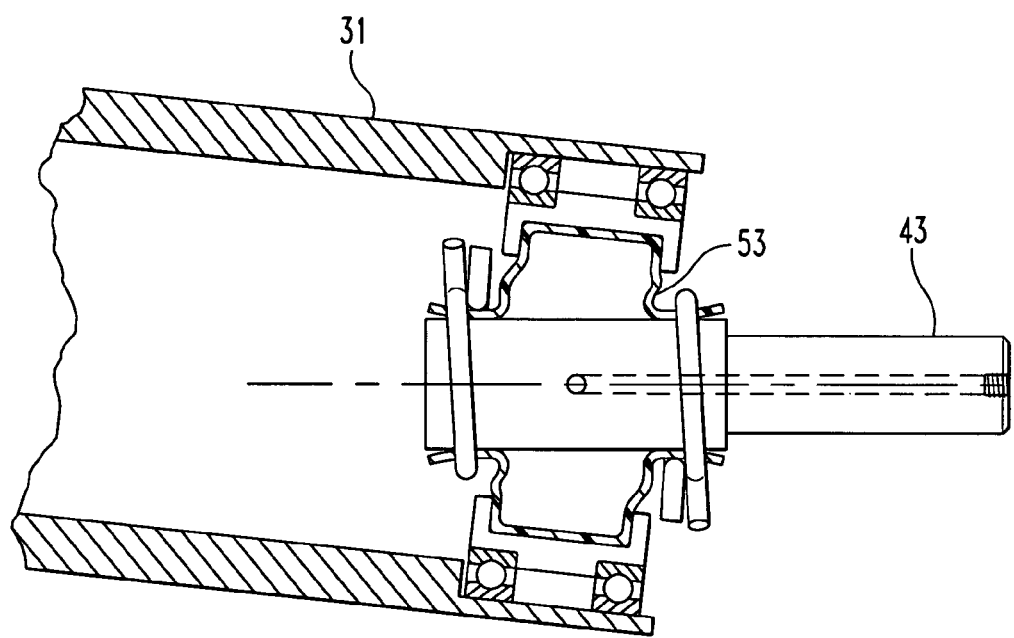
FIG. 7 is a fragmentary cross-sectional view of the right end of the centering roller of FIG. 6 illustrating the skewed position of the roller and the deformation of the bladder.

Fluid pressure within the bladders remain equal and constant causing the cylinder to revert back from the cocked position of FIG. 7 to its original position of FIG. 4 with the central axis of cylinder 31 being coincident with the axis extending through axles 42 and 43. As cylinder 31 moves to its original uncocked position relative to the axles, the belt moves back to its original position located equidistant between the opposite ends of the cylinder. Thus, the supporting structure including axles 42 and 43, bladders 63 and 53 and the bladder housings provide a supporting structure or means to normally urge the belt centering roller away from the skewed position of FIG. 6 to the perpendicular position relative to the direction of travel 26 illustrated in FIG. 5 thereby centering the belt on the roller and on the conveyor.

The fifth alternate embodiment of the present invention includes a web-centering roller illustrated in FIGS. 8–11. Centering roller 130 operates in the manner identical to the operation of roller 30. Centering roller 130 includes a cylindrical main body 131 with opposite end portions 134 and 135 rotatably mounted to a pair of upstanding brackets 136 and 137, in turn, mounted to a plate affixed to frame 28 (FIG. 1). A pair of fluid lines 160 and 161 are connected to a fluid pressure valve 162, in turn, connected to a source of fluid pressure with the opposite ends of the lines connected through the mounting brackets to bladders positioned externally of the cylindrical main body 131.

End 134 of centering roller 131 will now be described it being understood that an identical description applies to end 135. End 134 includes an outer mount or hub 140 fixedly mounted to the upstanding bracket 136. Mount 140 may be secured to bracket 136 by means of welds or other conventional fastening means.

Mount 140 is hollow and receives an inner hub 141 having a bladder 142 mounted thereto. Bladder 142 extends continuously around recess 143 of hub 141 and includes a fluid communication line 149 extending through bracket 136 and connected to line 160.

Hub 141 has a hollow center 145 in which is located conventional ring shaped bearings 146 into which an end of cylinder 131 projects. The end 134 of roller 131 has a reduced diameter to project into bearing 146 thereby rotatably mounting roller 131 to the hub. Hub 141 and bladder 142 float within outer hub 140; however, the fluid pressurized bladder 142 keeps the hub in place relative to mount 140 thereby preventing relative rotational motion therebetween.

In operation, movement of the belt across the top, side and bottom surface of roller 131 causes the roller to rotate within the bearings receiving the opposite ends of the roller. At the same time, the hub 141, bladder 142 and mount 140 and the hub and bladder within mount 150 do not rotate. Outer mount 150 is constructed identically to mount 140 and contains an identical hub and bladder as compared to hub 141 and bladder 142.

Centering roller 130 operates in a manner identical to roller 30 even though the bladders are located externally of roller 131 as compared to the bladders located internally in roller 31. Thus, as the belt moves toward the right end of roller 131 as viewed in FIG. 8, the end portion 135 of roller 131 will move toward the entrance of the conveyor while the opposite end portion 134 of the roller moves in an opposite direction thereby deforming each bladder as previously described and illustrated in FIG. 7. The bladders temporarily deform or distort by the bladder side walls stretching and collapsing from their original shapes. For example, bladder 53 is shown in FIG. 7 as having a right side wall in a partially collapsed condition while the left side wall is shown as stretched from its original position of FIG. 4. Since the fluid pressure within the bladders positioned adjacent the opposite ends of roller 131 is equal and constant due to lines 160 and 161, roller 131 is urged back to its original position extending perpendicularly across the direction of travel 26 thereby re-centering the belt on the roller.

As roller 131 tilts or assumes a skewed position relative to its original axis of rotation that was perpendicular to direction 26, the bladders within the inner hubs squeeze and deform as illustrated in FIG. 7 for the first embodiment. At the same time, the hubs within mounts 140 and 150 positioned externally of the roller 131 also assume a cocked or skewed position thereby resulting in the temporary deformation of the bladders.

Figure 12:
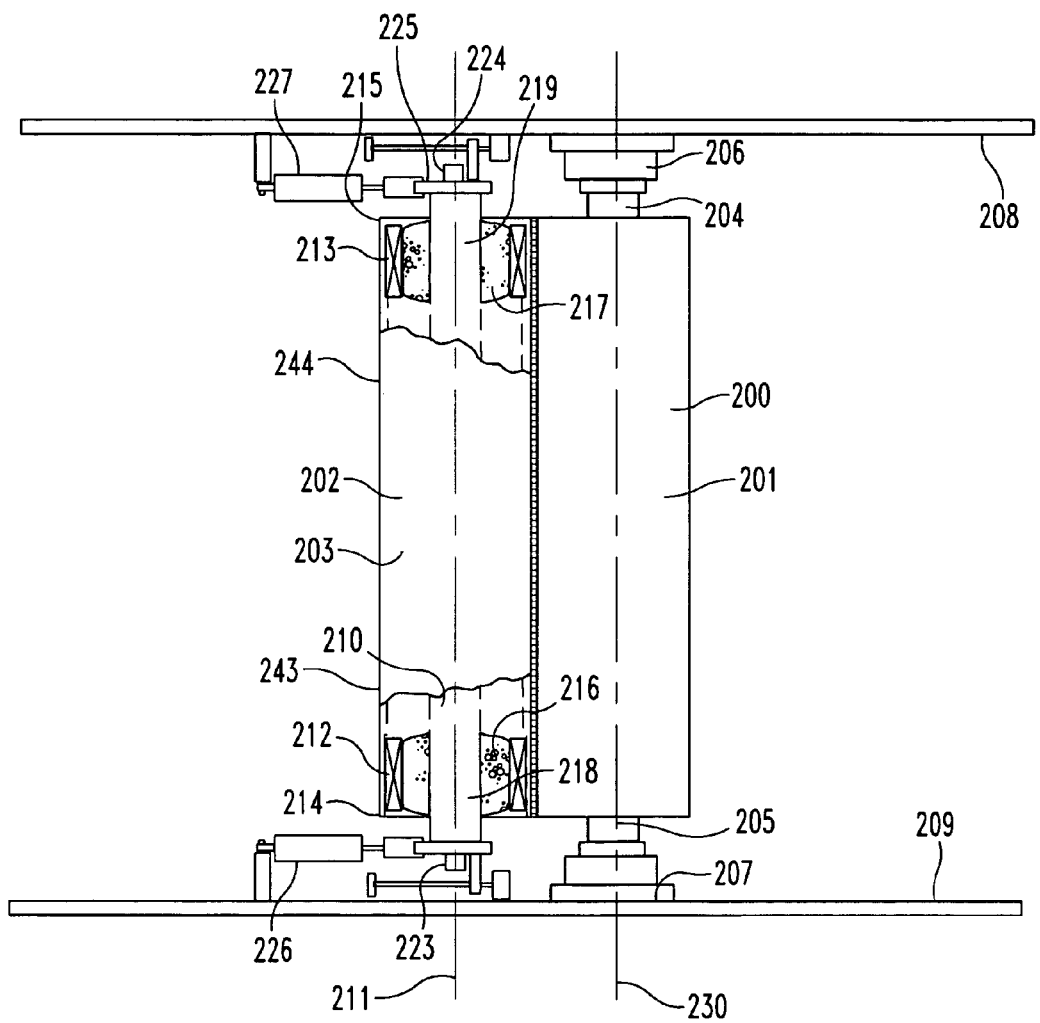
FIG. 12 is a fragmented top view of a metering roller located adjacent an impression roller showing the preferred embodiment of the present invention.
Figure 13:
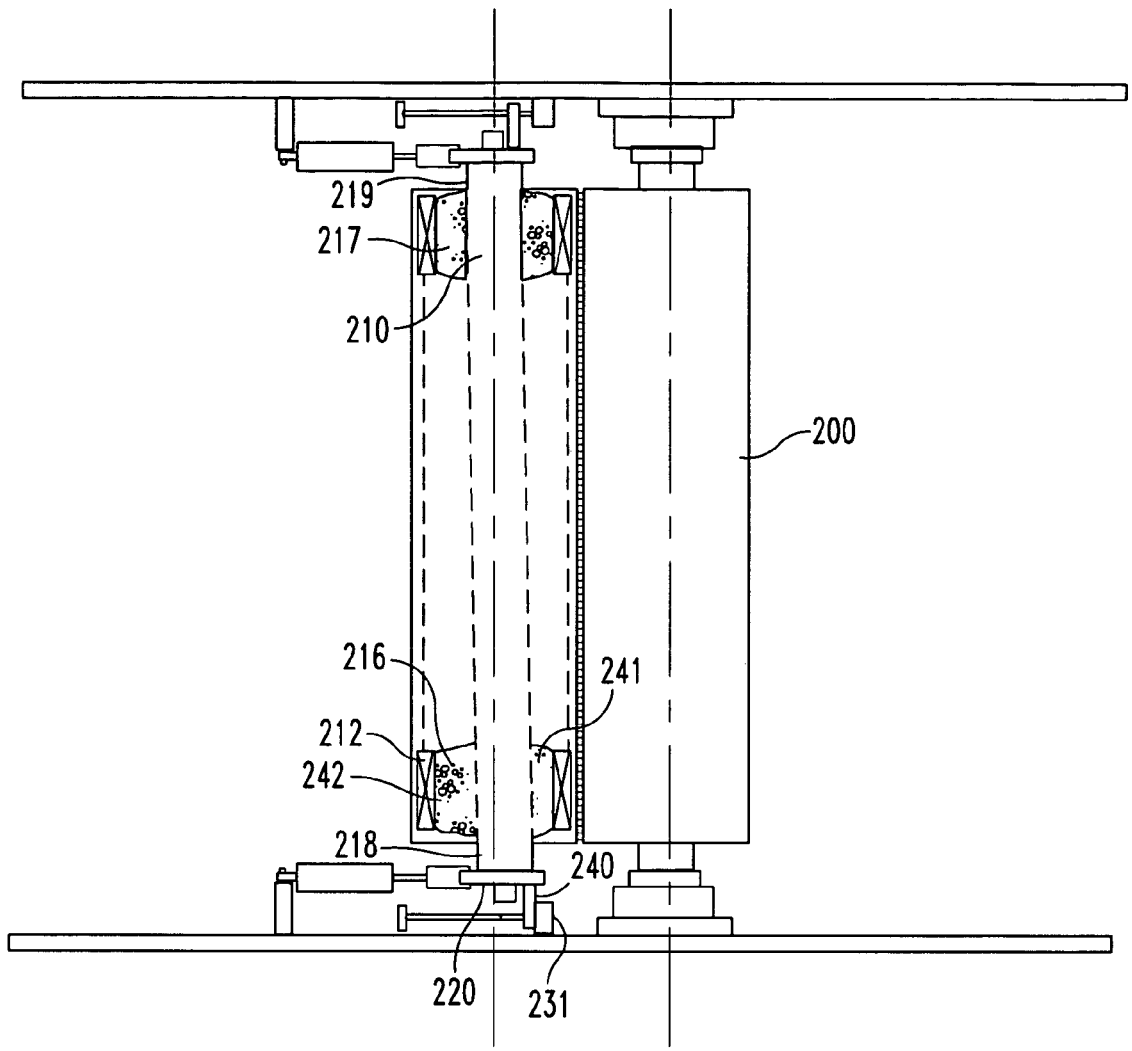
FIG. 13 is the same view as FIG. 12 only illustrating one end of the axle for the metering roller being located closer to the impression roller as compared to the opposite end of the axle.
Figure 14:
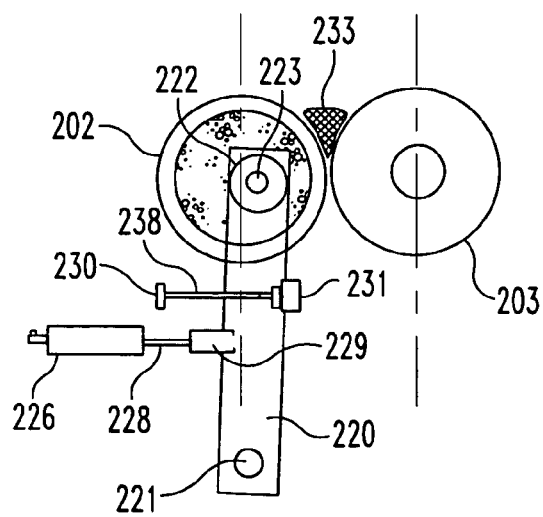
FIG. 14 is an end view of the rollers of FIG. 13.

The preferred embodiment of the present invention is shown in FIGS. 12–14. A conventional roller 200 has a cylindrical outer surface 201 spaced apart from a metering roller 202 having a cylindrical outer surface 203. The opposite ends of roller 200 include a pair of axles 204 and 205 rotatably received respectively by conventional bearings 206 and 207, in turn, fixedly secured to respectively, frame members 208 and 209. Metering roller 202 is operable to meter liquid 233 (FIG. 14) positioned between rollers 202 and 200 and located above the axis of rotation of each roller. The spacing between rollers 202 and 203 will determine the amount of liquid 210 or ink that is metered onto the impression roller.

Metering roller 202 is rotatably mounted to an axle 210 extending the length and along the center longitudinal axis 211 of roller 202 and axle 210. FIG. 12 is fragmented to illustrate axle 210 extending through roller 202. A pair of conventional cylindrical bearings 212 and 213 are held captive respectively at the opposite ends 214 and 215 of roller 202 by snap rings and surround axle 210. Located between the axle and the interior bearing race are a pair of pressurized bladders 216 and 217. Bladder 216 surrounds the end portion 218 of axle 210 and is positioned between the axle and the interior race of bearing 212. Likewise, bladder 217 surrounds the opposite end portion 219 of axle 210 and is positioned immediately adjacent and inward of the inner race of bearing 213. With axle 219 fixed, the outer cylinder 202 is free to rotate on bearings 212 and 213 and with respect to axle 219. Pressurization of bladders 216 and 217 control movement of the outer cylinder with respect to axle 219 and thus cylinder 201. Further, the bladders absorb shock around the bearings extending the life of the bearings and the journals.

The opposite ends of axle 210 are mounted in a pair of upwardly extending flanges that have bottom ends pivotally mounted to the frame members 208 and 209. For example, flange 220 (FIG. 14) has a bottom end 221 pivotally mounted to frame 209 and a top end 222 receiving the reduced diametered end 223 of axle 210. The opposite reduced diametered end 224 of axle 210 is received by flange 225 in the same manner as described for end 223 and flange 220.

A pair of pneumatic cylinders 226 and 227 are mounted respectively to frames 209 and 208 and have an extendable piston rod attached to flanges 220 and 225. For example, pneumatic cylinder 226 has an extendable piston 228 attached by bracket 229 to the mid-point of flange 220. Each flange 220 and 225 may be pivoted about their bottom ends when caused to move by axle 210 moving toward cylinder 200. Each flange 220 and 225 is restricted in pivotal movement by a pair of stops located on either side of each flange. For example, a pair of flanges 230 and 231 are fixedly mounted to frame 209 and contact the opposite edges of flange 220 as the flange pivots from a forward position to a rearward position. That is, with axle 210 moving to its extreme forward position toward roller 200, the edge of flange 220 will contact stop 231 preventing further movement of the flange and axle. Likewise, movement of the axle in an opposite direction will cause flange 220 to contact flange 230 limiting the rearward movement of the flange and axle. A guide rod 238 has opposite ends fixedly attached to flanges 230 and 231 with rod 238 extending through flange 240 attached to flange 220 guiding the flange as it moves between stops. A pair of stops identical to stops 230 and 231 are mounted fixedly to frame member 208 and have a guide rod extending therebetween and through flange 225 to guide flange 225 and control its forward and rearward movement with respect to roller 200.

Initially, equal fluid pressure is applied to cylinders 226 and 227 positioning axle 210 equidistant from roller 200 along the length of the axle. Likewise, equal fluid pressure is applied to each bladder 216 and 217 causing the roller 202 to be centered with respect to axle 210 thereby positioning cylinder 202 equidistant from cylinder 200 along the length of cylinder 202.

During the initial setup, it is possible that the operator will pressurize cylinders 226 and 227 in such a manner that axle 210 and its longitudinal axis 211 may not be parallel to cylinder 200. Likewise, it is possible during operation that axle 210 may become skewed with respect to cylinder 200. That is, it is possible that sometime during either the initial setup or during use of the metering roller, axle axis 211 may become skewed with respect to the longitudinal center axis 230 of roller 200. In either case, bladders 216 and 217 are operable to position surface 203 equidistant from surface 201 along the length of cylinder 202 or in the event the surfaces 203 and 201 are in contact, bladders 216 and 217 are operable to maintain a constant pressure of surface 203 against surface 201.

As an example, end portion 218 of axle 210 is shown in FIG. 13 as being closer to roller 200 as compared to end portion 219 of axle 210. Thus, flange 220 including its arm 240 affixed thereto has contacted stop 231 preventing further movement of the axle end portion 218 towards roller 200. Bladders 216 and 217 each include the same pressure existing in the bladder as during its initial setup illustrated in FIG. 12. Bladder 216 has a portion 241 located between axle 210 and the inner race of bearing 212 and on the side closest to roller 200 that has been reduced in size being squeezed between the axle and the inner race. The remaining portion 242 located rearwardly of the axle has increased in size thereby maintaining a constant pressure within the bladder and a constant pressure exerted against bearing 212 and thus a constant pressure between roller surface 203 and roller surface 201. Likewise, the pressure within bladder 217 is the same as within bladder 216. Thus, the pressure exerted by roller surface 203 against roller surface 201 at ends 243 and 244 is constant and equal and also along the length of roller 202 even though the axis 211 of the axle has become skewed relative to axis 230 of the impression roller.

Figure 15:
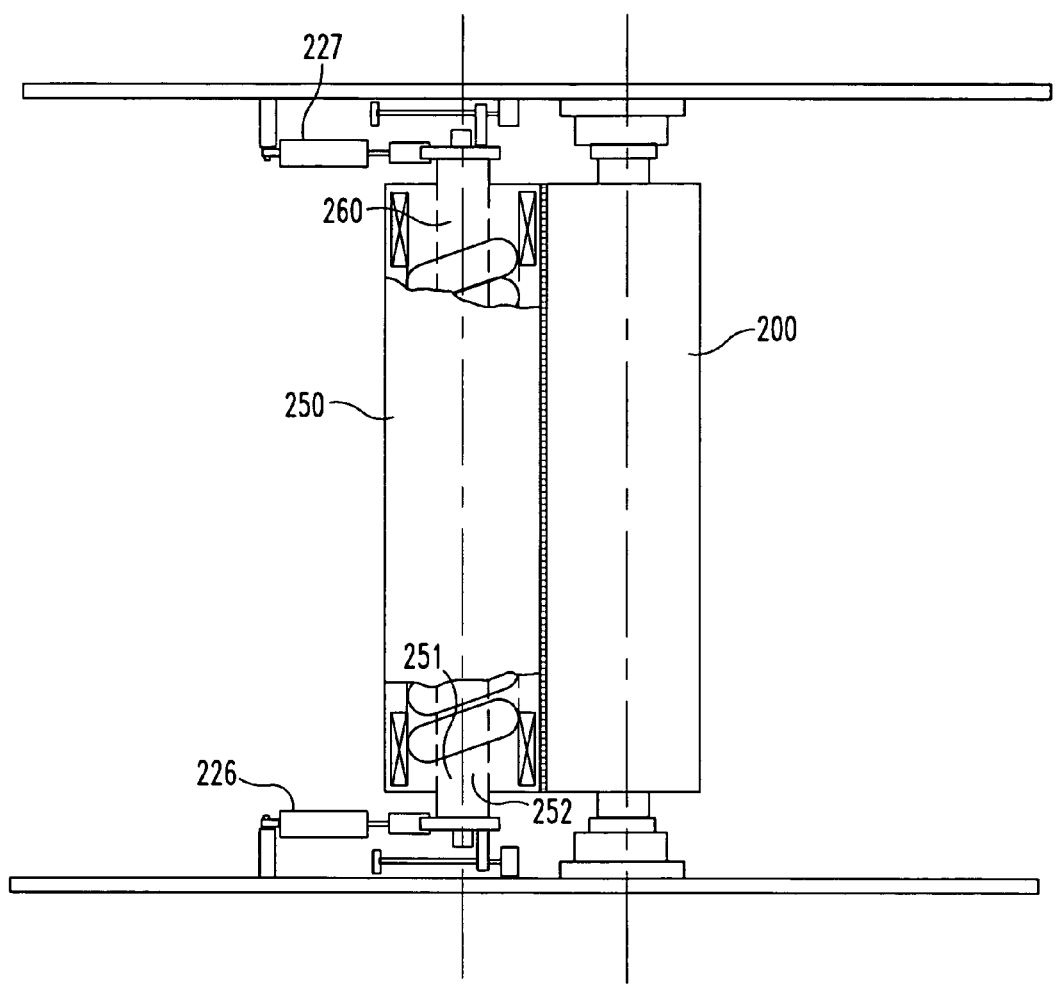
FIG. 15 is the same view as FIG. 12 only illustrating a ductor roller positioned adjacent the impression roller and utilizing the first alternate embodiment of the present invention.
Figure 16:
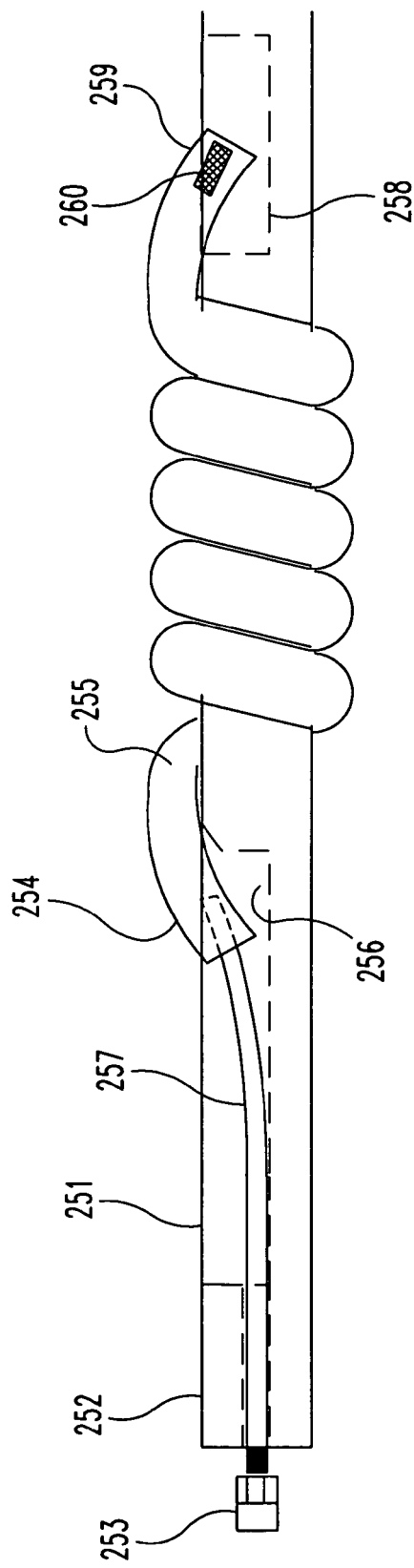
FIG. 16 is a top view of the axle and bladder positioned within the ductor roller shown in FIG. 15.

The first alternate embodiment of the present invention is shown in FIGS. 15 and 16. An impression roller 200 is mounted to the frame member in a manner identical to that described previously for the preferred embodiment of FIG. 12. Ductor roller 250 is mounted next to roller 200. A ductor roller is subject to constant banging against an impression roller and thus, any bladders located within the ductor roller will have considerably more abuse as compared to the bladders within metering roller 202. Thus, the bladder utilized with the first alternate embodiment of FIGS. 15 and 16 extends wrappingly and spiralingly around the length of the axle 251 with only a single bladder utilized. The bladder is attached through the shaft at one end and plugged at the opposite end of the bladder tube.

Axle 251 (FIG. 16) in the first alternate embodiment includes a one-quarter inch outside diameter copper tube 257 that extends through the center of end portion 252 of the axle. One end of the copper tube is attached to a compression fitting 253 whereas the opposite end is connected to end 254 of bladder 255. Bladder 255 extends spiralingly around axle 251 and is closed by plug 260 at its opposite end 259. Axle 251 includes a recess 256 opening into the center passage of the axle through which tube 257 extends. Thus, copper tube 257 does not extend outwardly of the outer surface of the axle and is positioned within recess 256 while being in fluid communication with bladder 255. Likewise, a second recess 258 is provided at the opposite end of the axle to locate plug 260 within the outside surface of the axle. Plug 260 sealingly closes end 259 of the bladder tube.

The opposite end portions 252 and 260 of axle 251 are mounted and controlled in an identical manner to the opposite end portions of axle 210. Thus, a pair of pneumatic cylinders 226 and 227 are provided along with the associated stops and flanges 220 and 225 previously described for the preferred embodiment of FIG. 12. Compression fitting 253 may either sealingly close the bladder maintaining a constant fluid pressure within bladder 255 or may be connected to a source of pressurized fluid to maintain the fluid pressure at a constant level within the bladder.

Bladder 255 may extend substantially along the entire length of axle 251 so as to be positioned between bearings 212 and 213 in a manner similar to that described for the preferred embodiment of FIG. 12. Alternatively, bladder 255 may extend around axle 251 from one bearing to the opposite bearing without extending between the inner race of the bearing and the axle.

The ductor roller operates in a manner identical to the operation previously described for metering roll 202. Thus, if the longitudinal axis of axle 251 becomes skewed with the longitudinal axis of roller 200, the pressure within bladder 255 is operable to maintain a constant and equal force of ductor roller 250 against impression roller 200. For example, if a portion of axle 251 moves closer to impression roller 200 then the bladder will be squeezed at the location of the axle moving closer to the impression roller; however, the pressure within the bladder will remain constant at that particular location maintaining constant pressure of roller 250 against roller 200.

Figure 18:
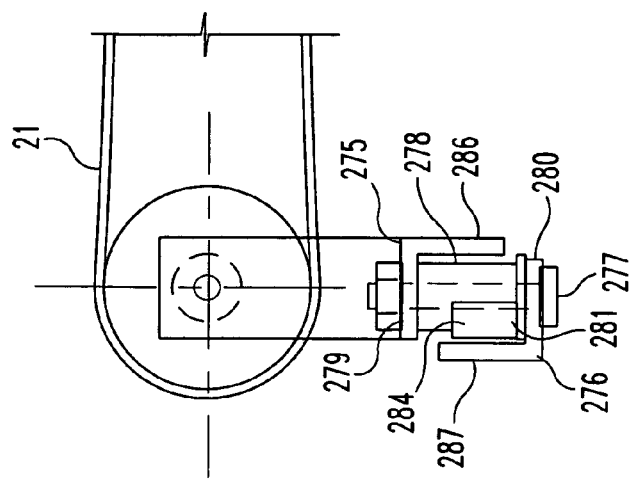
FIG. 18 is an end view of the roller of FIG. 17.
Figure 17:
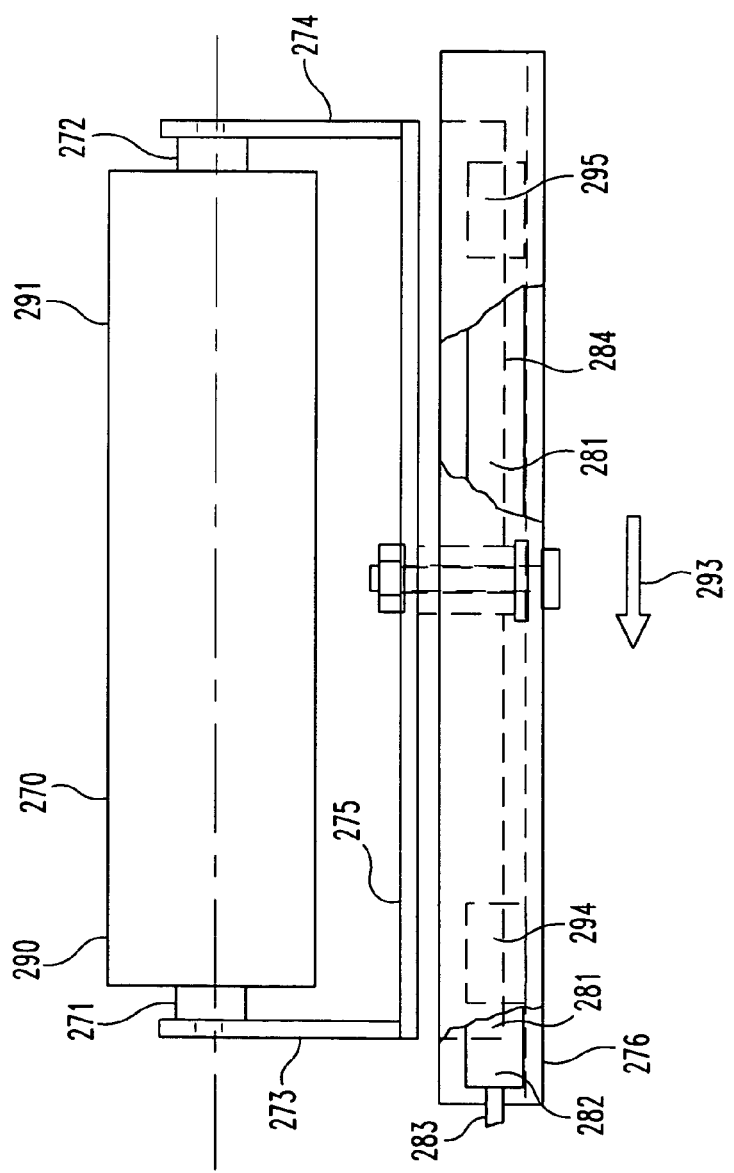
FIG. 17 is a fragmented side view of a roller incorporating the second alternate embodiment of the present invention.
Figure 19:
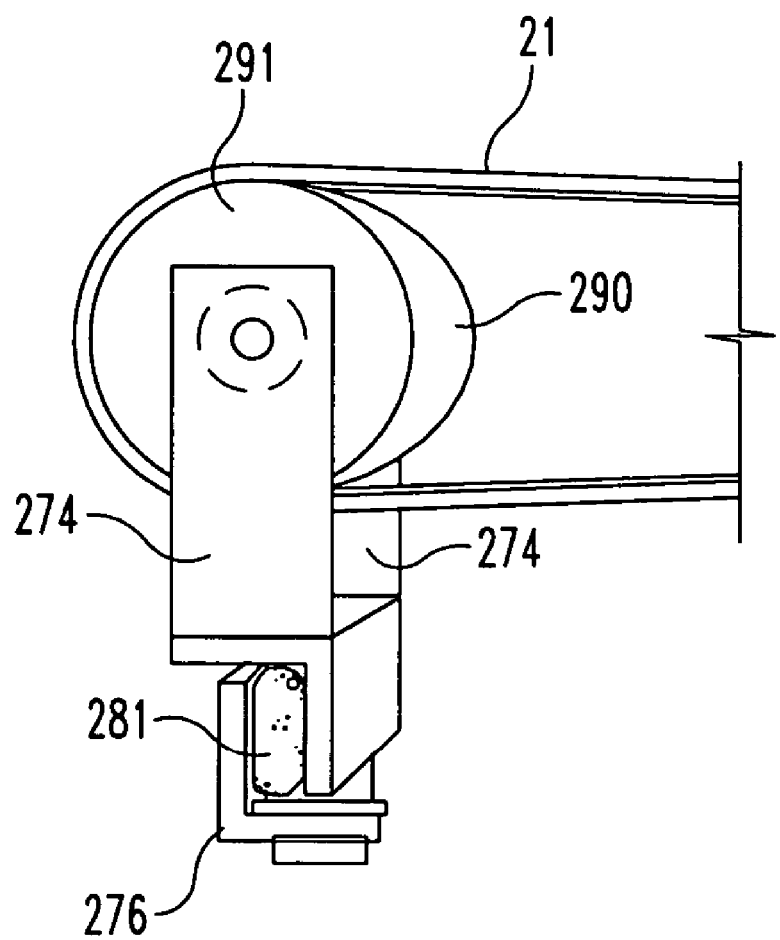
FIG. 19 is the same view as FIG. 18 only showing the roller mis-aligned.

A second alternate embodiment of the present invention is shown in FIGS. 17–19. The roller and bladder shown therein is used in the conveyor assembly depicted in FIG. 1 and replaces belt centering device 30 for automatically centering belt 21 with respect to the conveyor and rollers 27.

Roller 270 includes a pair of opposite reduced diameter ends 271 and 272 rotatably mounted in upstanding arms 273 and 274; in turn, fixedly mounted atop a downwardly extending L-shaped bracket 275. Bracket 275 is bolted and pivotally supported by fastener 277 to an upwardly extending L-shaped bracket 276. Conveyor belt 21 (FIG. 18) extends around the cylindrical surface of roller 270 that includes a pressurized bladder positioned between L-shaped brackets 275 and 276 for automatically centering the belt on roller 270. Fastener 277 is a standard bolt nut combination extending through a spacer positioned between and against the horizontally extending flanges 279 and 280 respectively of brackets 275 and 276. The spacer and fastener allows bracket 275 to pivot about the longitudinal axis of fastener 277 while L-shaped bracket 276 remains fixed to the conveyor frame.

A single pressurized bladder 281 (FIG. 19) has a first end 282 either sealed or connected to a source of constant fluid pressure. The opposite end 284 of the bladder is sealed.

Bladder 281 is positioned between the horizontal walls 279 and 280 of the L-shaped brackets and is also positioned between the vertically extending walls 286 and 287 (FIG. 18) of the L-shaped brackets. By maintaining a constant fluid pressure within bladder 281, roller 270 is forced to its perpendicular position relative to the conveyor belt. As the conveyor belt 21 tracks off center relative to roller 270, a force is created to one end of roller 270 causing the other end of the roller to be forced in the opposite direction thereby forcing the conveyor to track back to the center of the roller. For example, if end 290 (FIG. 19) of roller 270 moves toward the opposite end 22 (FIG. 1) of the conveyor while end 291 moves in the opposite direction, brackets 275 and 276 will squeeze the end portion 284 of bladder 281 causing the bladder to expand adjacent end 282 of the bladder. The pressure within the bladder is constant thereby causing end portion 284 of the bladder to then expand towards its original size forcing fluid flow in the direction of arrow 293 and allowing end portion 290 of the roller to move away from the opposite end 22 of the conveyer towards its original position centering the conveyor upon roller 290.

A pair of semi-cylindrical projections 294 and 295 are fixedly mounted to wall 287 of L-shaped bracket 276 to increase the sensitivity of the bladder by reducing the amount of space through which bladder 281 extends.

Figure 21:
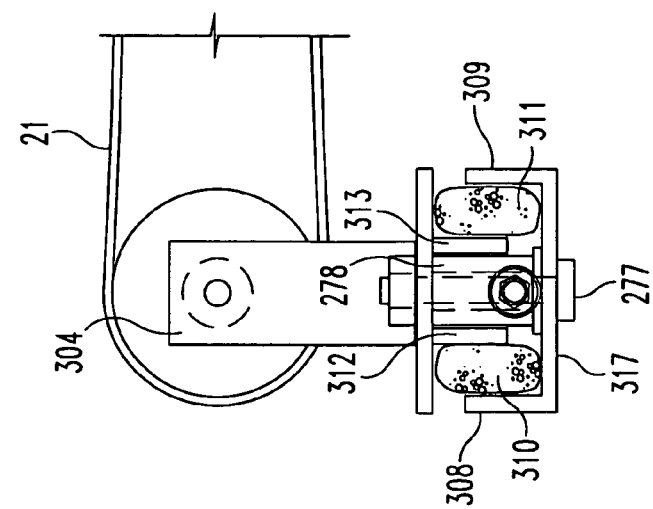
FIG. 21 is an end view of the roller of FIG. 20.
Figure 20:
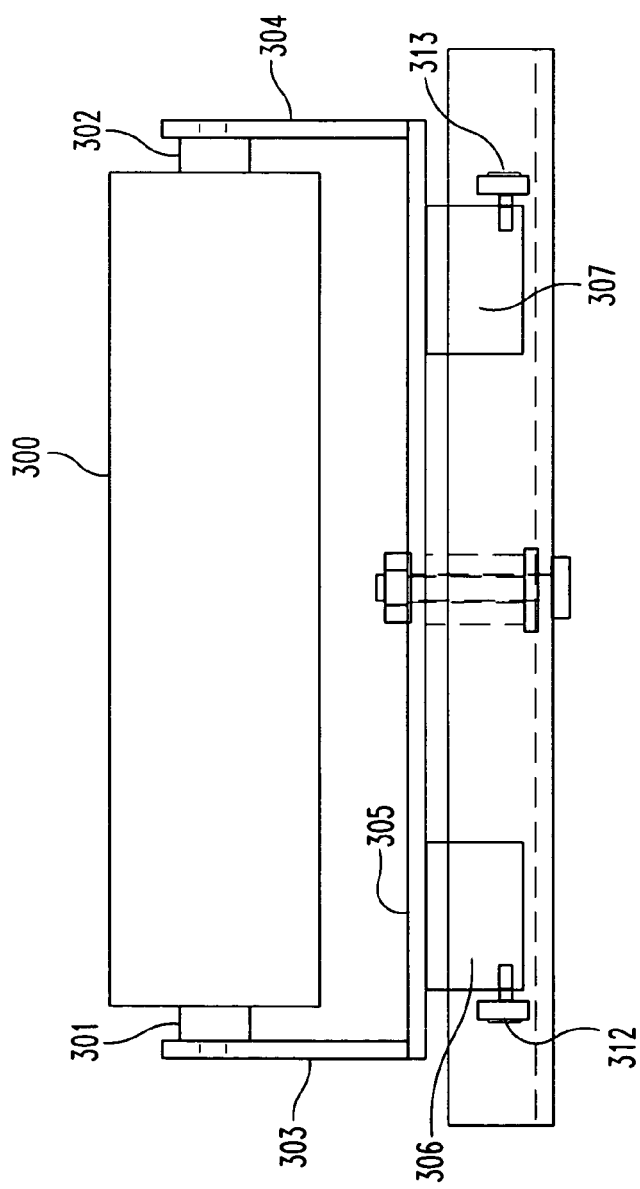
FIG. 20 is a side view of a roller incorporating the third alternate embodiment of the present invention.

A third alternate embodiment of the conveyor belt roller is shown in FIGS. 20 and 21 and is identical to the second alternate embodiment of FIGS. 17–19 with the exception that a pair of bladders are utilized between a pair of opposed C-shaped brackets.

Roller 300 has reduced diametered opposite ends 301 and 302 mounted by conventional bearings to upstanding flanges 303 and 304 fixedly mounted to wall 305 having two pairs of downwardly extending walls 306 and 307 depending from and attached to wall 305. An upwardly extending C-shaped bracket 317 is pivotally mounted to wall 305 by means of the fastener 277 and spacer 278 previously described for the embodiment of FIGS. 17–19. Bracket 307 includes a pair of upstanding walls 308 and 309 spaced outwardly of the two pairs of downwardly extending walls 306 and 307 with a pair of fluid bladders 310 and 311 positioned therebetween. Thus, wall pair 307 consists of two walls 312 and 313 extending downwardly on either side of spacer 278 with wall 312 being spaced from wall 308 between which bladder 310 is located and wall 313 being spaced apart from wall 309 between which bladder 311 is positioned.

Likewise, pair 306 includes a pair of downwardly extending walls on either side of spacer 278 being spaced apart from walls 308 and 309. Bladder 310 extends between wall 308 and one of the walls of pair 306 in a manner identical to bladder 310 extending between wall 308 and wall 312. Bladder 311 extends between wall 309 and the other wall of pair 306 in a manner identical to bladder 311 extending between wall 309 and wall 313. Bladder 310 includes a fluid fitting 312 whereas bladder 311 includes fluid fitting 313. Fittings 312 and 313 may sealingly close each bladder thereby maintaining the pressure within each bladder. Alternatively, each fitting may be connected to a source of pressure to maintain the pressure within each bladder.

Roller 300 operates identical to the operation of roller 270 with the exception that a pair of bladders are used instead of a single bladder. As the conveyor belt 21 tracks off center relative to roller 300, a force is created at one end of the roller causing the other end of the roller to be forced at equal pressure in the opposite direction thereby causing the conveyor belt to track back to the center of the roller. The two fluid bladders respond as cushions to absorb rapid changes in the belt that may be caused when items are placed upon the belt for conveyance thereby preventing oscillation and overshoot of the belt. With the fluid supply regulated to each bladder 310 and 311, increasing or decreasing the pressure in each bladder can control the belt tracking correction response. Alternatively, each bladder is sealed from each other maintaining a constant pressure in each bladder.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A liquid applicator comprising:
 a first rotatably mounted roller with a first cylindrical surface;
 a second rotatably mounted roller with a second cylindrical surface positioned adjacent said first cylindrical surface forming an liquid receiving area;
 an axle having a longitudinal axis in a first position with said axle extending through said second roller, said axle having movably mounted opposite first and second ends to allow said axle to move relative to said first roller and allow said axle to skew moving said first axis from said first position to a second position; and,
 a first pressurizable bladder extending between said second roller and said axle and having a constant internal pressure to urge said second roller against said first roller at a constant pressure even though said axle and axis moves between said first position and said second position.

2. The liquid applicator of claim 1 wherein:
 said axle is spaced inwardly from said second roller forming a cavity therebetween, said first bladder extends wrappingly around the length of said axle within said cavity, said bladder is squeezed between said axle and said second roller when said axle moves to second axis with constant pressure within said bladder urging said second roller against said first roller at a constant pressure along the length thereof.

3. The liquid applicator of claim 2 wherein:
 said axle includes a central passage connected to an end of said bladder which has an opposite sealed end, said central passage leading externally of said axle.

4. The liquid applicator of claim 1 and further comprising;
 a second pressurizable bladder extending between said second roller and said axle and having a constant internal pressure to urge said second roller against said first roller, said first bladder and said second bladder are located respectively at said first and second ends between said axle and said second roller.

5. The liquid applicator of claim 4 and further comprising:
 a pair of bearings mounting at said ends bearingly mounting said second roller to said axle with said first bladder and said second bladder located between said axle and said second roller.

6. The liquid applicator of claim 5 and further comprising:
 a pair of fluid cylinders receiving said ends of said axle and allowing said ends to move as said axle moves between said first position and said second position; and,
 stops located adjacent said axle to contactingly limit movement of said ends of said axle.

* * * * *